(12) United States Patent
Swix et al.

(10) Patent No.: US 6,978,470 B2
(45) Date of Patent: Dec. 20, 2005

(54) SYSTEM AND METHOD FOR INSERTING ADVERTISING CONTENT IN BROADCAST PROGRAMMING

(75) Inventors: Scott R. Swix, Duluth, GA (US); Paul T. Watson, Alpharetta, GA (US); James H. Gray, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/034,654

(22) Filed: Dec. 26, 2001

(65) Prior Publication Data

US 2003/0121037 A1 Jun. 26, 2003

(51) Int. Cl.⁷ .............................................. H04N 7/10
(52) U.S. Cl. ............................ 725/32; 725/46; 725/68; 725/85
(58) Field of Search ............................ 725/32, 34, 35, 725/46, 68, 70, 85; 709/217–219; 705/3, 705/10, 14, 51

(56) References Cited

U.S. PATENT DOCUMENTS

| | | | |
|---|---|---|---|
| 5,630,204 A * | 5/1997 | Hylton et al. | |
| 6,160,989 A * | 12/2000 | Hendricks et al. | |
| 6,463,585 B1 * | 10/2002 | Hendricks et al. | |
| 2001/0049620 A1 * | 12/2001 | Blasko | 705/10 |
| 2002/0083441 A1 * | 6/2002 | Flickinger et al. | |
| 2002/0083442 A1 * | 6/2002 | Eldering | |
| 2002/0123928 A1 * | 9/2002 | Eldering et al. | 705/14 |
| 2002/0129368 A1 * | 9/2002 | Schlack et al. | |
| 2002/0144262 A1 * | 10/2002 | Plotnick et al. | |
| 2002/0178447 A1 * | 11/2002 | Plotnick et al. | |

* cited by examiner

Primary Examiner—Kieu-Oanh Bui
(74) Attorney, Agent, or Firm—Woodcock Washburn LLP

(57) ABSTRACT

A system for inserting viewer-specific advertising content comprises a viewer device. The viewer device identifies viewer characteristics regarding the viewer. Upon receipt of advertising content, the viewer device identifies advertisements matching the viewer characteristics. The viewer device inserts the advertisements matching the viewer characteristics into broadcast content.

10 Claims, 6 Drawing Sheets

SYSTEM AND METHOD FOR INSERTING ADVERTISING CONTENT IN BROADCAST PROGRAMMING

BACKGROUND OF THE INVENTION

1. Field of the Invention

The present invention relates to systems and methods for inserting into broadcast programming advertising content targeted to specific viewers. More specifically, the invention relates to identifying viewer characteristics and inserting into broadcast programming advertising content corresponding to the viewer characteristics.

2. Description of the Prior Art

In existing national and local network broadcast systems, advertisement insertion is controlled by cue tones. A cue-tone is an audible signal that is placed into the television program stream, typically by the content provider such as a studio to identify to local broadcasters when to insert an advertisement. Cue-tones are placed at specific points in programming streams to indicate where advertisements may be inserted—typically at the beginning and ending of shows, and at the 10, 12, 15, and 30 minute marks of a program. Cue tones also indicate the duration of the advertising break. For example, cue-tones may dictate insertion of a 15, 30, 45, 60, 90, or 120 second segment. Content providers use cue-tone generators to insert the tones into the broadcast prior to forwarding broadcast content to local broadcasters. Local broadcast operators employ cue-tone based advertising insertion systems to detect the cue-tones and insert the desired advertising. The cue tones occur a number of seconds before the advertising is to actually be inserted, allowing the automated insertion systems time to cut-over and play advertising content that is applicable to the local broadcaster's broadcast region.

Generally, existing advertising insertion systems operated by broadcast programmers are located at a centralized distribution point that sometimes is referred to as a headend. The broadcaster is limited to inserting generic advertisements that will be presented to all viewers receiving content "downstream" from this centralized distribution point. These centralized advertising insertion systems provide the ability to target viewers based on "upstream" characteristics such as the broadcast source (for example, the broadcast network) or the specific program into which the advertising content is to be inserted. For example, existing advertisement insertion systems may insert an advertisement for a program from the same provider, or advertisements specially directed at persons in the "target audience" of the program presently airing.

Applicants have recognized, however, that existing centralized insertion systems lack the capability to target viewers and viewer groups within the broadcast area. Indeed, due to the centralized nature of existing advertisement insertion systems, the systems are limited in their capability to target viewers based upon "downstream" characteristics such as, for example, the characteristics of the viewers themselves. Indeed, the capability to provide advertising geared toward individual viewer characteristics would be particularly valuable for broadcast providers such as direct to home satellite (DTH) providers whose service area typically includes a large geographic and broad demographic region. For example, it would be a great improvement in the art to match advertisements to a particular viewer based upon the viewer's age, location, viewing habits, etc. Such a system would be beneficial to viewers, broadcasters, and advertisers alike.

SUMMARY OF THE INVENTION

The present invention is directed to systems and methods for inserting viewer specific advertising content in broadcast programming. A viewer device such as, for example, a set top box (STB)located at a home or viewer location gathers data identifying the characteristics of a viewer such as, for example, the viewer's age, gender, marital status, geographic location, and viewing habits. The viewer characteristic data is used to identify advertising content corresponding to the characteristics of a viewer. The viewer device comprises a broadcast receiver for receiving broadcast content transmitted by a broadcast content provider over a broadcast network. The viewer device further comprises a broadband connection device for receiving advertising content transmitted by an advertising content server over a broadband network. Upon receiving the advertising content, the viewer device selects advertisements matching the viewers characteristics and inserts the selected advertisements into the broadcast programming. Thereafter, the viewer device transmits the broadcast content and inserted advertising content to a television for viewing at the home or viewer location.

According to an aspect of the present invention, the viewer device may gather data identifying the characteristics of a viewer by categorizing broadcast programming and recording the frequency and duration with which the viewer is tuned to broadcast programming in each category. The viewer device may also gather viewer characteristics via a program for requesting information from the viewer.

According to another aspect of the present invention, the advertising content server transmits advertising content to the viewer device, and the viewer device identifies advertising content corresponding to the characteristics of a viewer. Alternatively, the viewer device may transmit over a broadband network data identifying the characteristics of a viewer to the advertising content server, and the advertising content server may identify advertising content corresponding to the characteristics of a viewer.

According to another aspect of the present invention, advertising content can be transmitted to the viewer device and simultaneously inserted into the broadcast content in real time. Alternatively, advertising content may be stored in memory at the viewer device for insertion into the broadcast content at a later time. Cue tones may be inserted in the broadcast content to identify locations where advertising content may be inserted.

BRIEF DESCRIPTION OF THE DRAWINGS

The present invention will be better understood after reading the following detailed description of the presently preferred embodiments thereof with reference to the appended drawings, in which.

DETAILED DESCRIPTION

Figure 1:
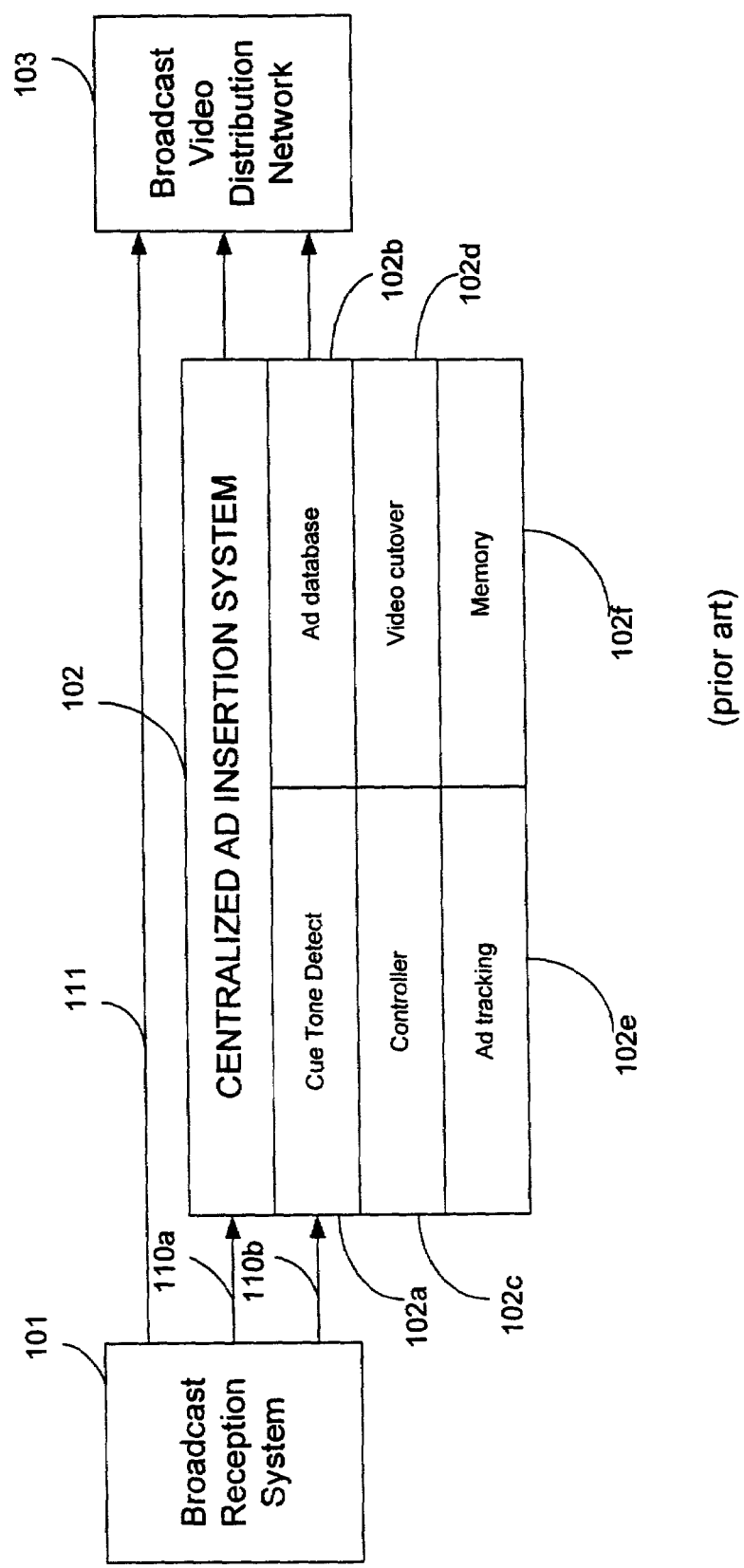
FIG. 1 illustrates an existing centralized ad insertion system.

Systems and methods for advertisement insertion in accordance with the invention are described below with reference to FIGS. 1–6. Those skilled in the art will readily appreciate that the description given herein with respect to those figures is for explanatory purposes only and is not intended in any way to limit the scope of the invention. Throughout the description, like reference numerals will refer to like elements in the respective figures.

FIG. 1 illustrates an existing centralized advertisement insertion system. Generally, broadcast video streams that are transmitted from broadcast sources such as production studios are received at broadcast reception system 101. If advertisement is to be inserted, the video stream is sent through ad insertion system 102. Alternatively, a video stream may bypass ad insertion system 102 if no advertisement insertion is to take place. For example, video streams 110a and 110b are sent through the ad insertion system, while video stream 111 bypasses the ad insertion system. After an ad has been inserted or the ad insertion process has been bypassed, video streams are received by broadcast video distribution network 103 for transmission over a broadcast network such as a DTH satellite network or a cable network.

Typically, ad insertion system 102 comprises several components. Cue tone detector 102a identifies locations where advertising content is to be inserted. Ad database 102b stores in memory advertisement that may be inserted. Controller 102c plans what ads are to be run at what intervals. Video cutover 102d temporarily blocks the incoming video stream, plays the advertising to be inserted, and then cuts back to the incoming video stream. Ad tracking system 102e records which ads are inserted for reporting and billing purposes. Ad duration database 102f stores in memory the duration of the ads in ad database 102b.

Figure 2:
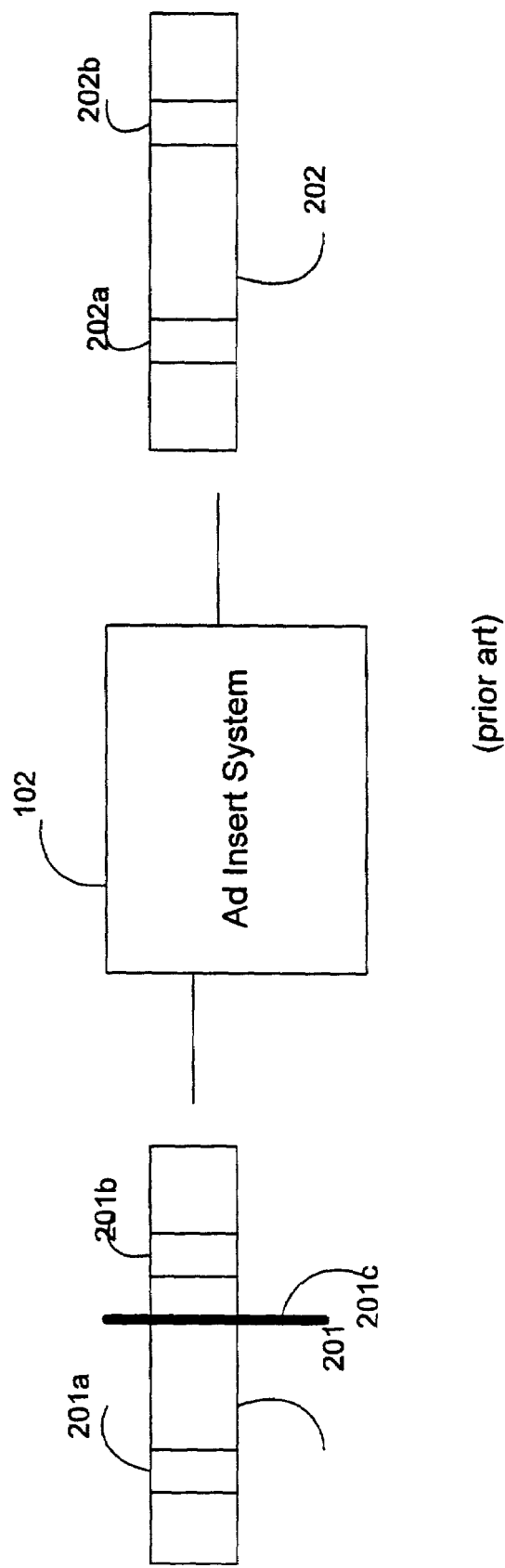
FIG. 2 illustrates a video stream with generic ads and cue tones, before and after insertion of advertisements.

FIG. 2 illustrates components of a typical video stream before and after processing by an advertisement insertion system. A shown, original video stream 201 contains locations 201a and 201b in which advertisements may be inserted. Video stream 201 also contains cue tone 201c, which serves to identify locations where advertising content may be inserted by ad insertion system 102. Video stream 201 is converted to video stream 202 upon passing through system 102. Video stream 202 contains locations 202a and 202b corresponding to locations 201a and 201b of video stream 201. As shown, location 202a is identical to location 201a as no ad has been inserted. However, at location 202b an ad has been inserted.

The advertisement insertion system of FIG. 1 provides for the centralized insertion of advertisements prior to broadcast. Accordingly, advertisements are typically selected based upon "upstream" characteristics such as the broadcast source or the identity of the presently airing program. Such systems provide little or no capacity to tailor advertisements to specific viewers.

Figure 3:
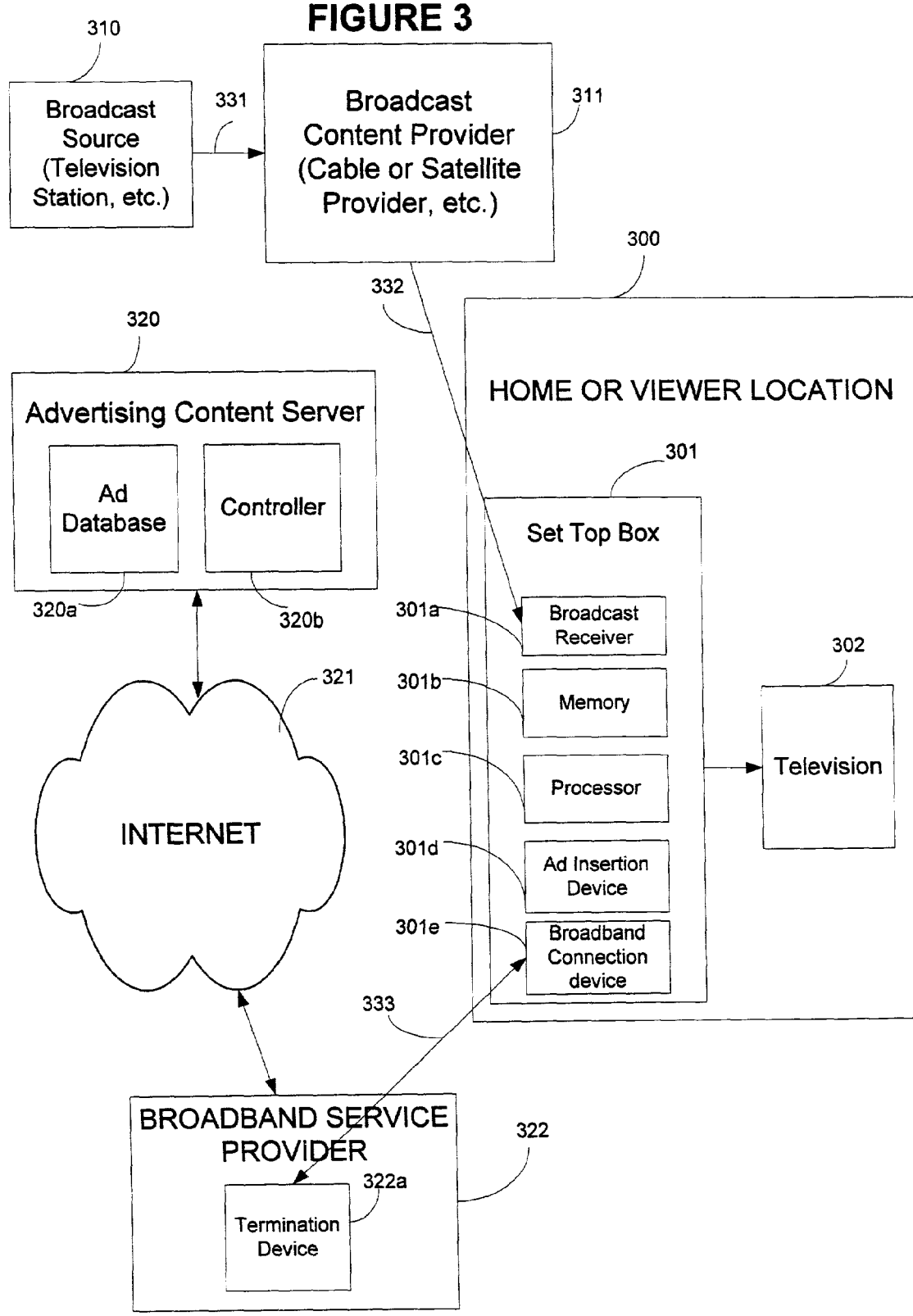
FIG. 3 is a block diagram of an illustrative advertisement insertion system in accordance with the present invention.

FIG. 3 is a block diagram of a system for viewer specific advertisement insertion in accordance with the present invention. As shown, home or viewer location 300 contains a viewer device 301 that provides a video input to television 302. Viewer device 301 may be, for example, a set top box, a home gateway, a personal computer, or any electronic device capable of receiving, storing, and processing video signals. Generally, viewer device 301 receives broadcast content from broadcast service provider 311 over communication channel 332. Viewer device 301 also receives advertising content from broadband service provider 322 over communication channel 333. Viewer device 301 operates to insert advertisements specific to the viewer's characteristics as described below in connection with FIGS. 4–6.

Viewer device 301 comprises several components. Broadcast receiver 301a enables viewer device 301 to receive programming transmitted from broadcast content provider 311, and may be for example a DTH satellite receiver, cable receiver, or the like. Memory 301b stores input data such as data identifying the viewing characteristics of a viewer. Processor 301c enables the viewer device to gather input data such as data identifying the viewing characteristics of the operator. Ad insertion system 301d performs ad insertion tasks similar to ad insertion system 102 discussed previously. Broadband connection device 301e provides connectivity to broadband data network 322 and may be, for example, a modem device for communication over a digital subscriber line (DSL) or cable modem connection.

Broadcast source 310 which may be, for example, a television broadcast corporation or other source of broadcast programming, supplies broadcast content to broadcast content provider 311. Content such as, for example, TBS, The Discovery channel, and ESPN may be downloaded from source 310 to a content provider 311 via a satellite link, for example. Broadcast provider 311 broadcasts content to viewers and may be, for example, a DTH satellite provider or a cable television provider.

Advertising content server 320 comprises an ad database 320a that stores in memory ads to be inserted. Server 320 further comprises a controller 320b for selecting and queuing advertising content to be transmitted to the viewer device. In one embodiment of the illustrative system as described in detail in connection with FIG. 4, advertising content server 320 simply transmits advertisements through broadband service provider 322 to viewer device 301 where advertisements are selected based upon viewer characteristics. According to another embodiment of the illustrative system as described in detail in connection with FIG. 5, advertising content server 320 receives viewer characteristics from viewer device 301 via broadband service provider 322. Thereafter, advertising content server 320 selects advertisement matching the viewer characteristics and forwards only these matching advertisements to viewer device 301 for insertion.

Broadband service provider 322 provides a broadband connection between viewer device 301 and content server 320. Broadband service provider may be, for example, a DSL service provider, a cable internet service provider, or the like. Generally, service provider 322 receives high speed connections 332 from viewer device 301 and provides access to content server 320 via the internet 321. As shown, service provider 322 comprises a termination device 322a for receiving a communication line from viewer device 301. Device 322b may be, for example, a DSL modem.

Figure 4:
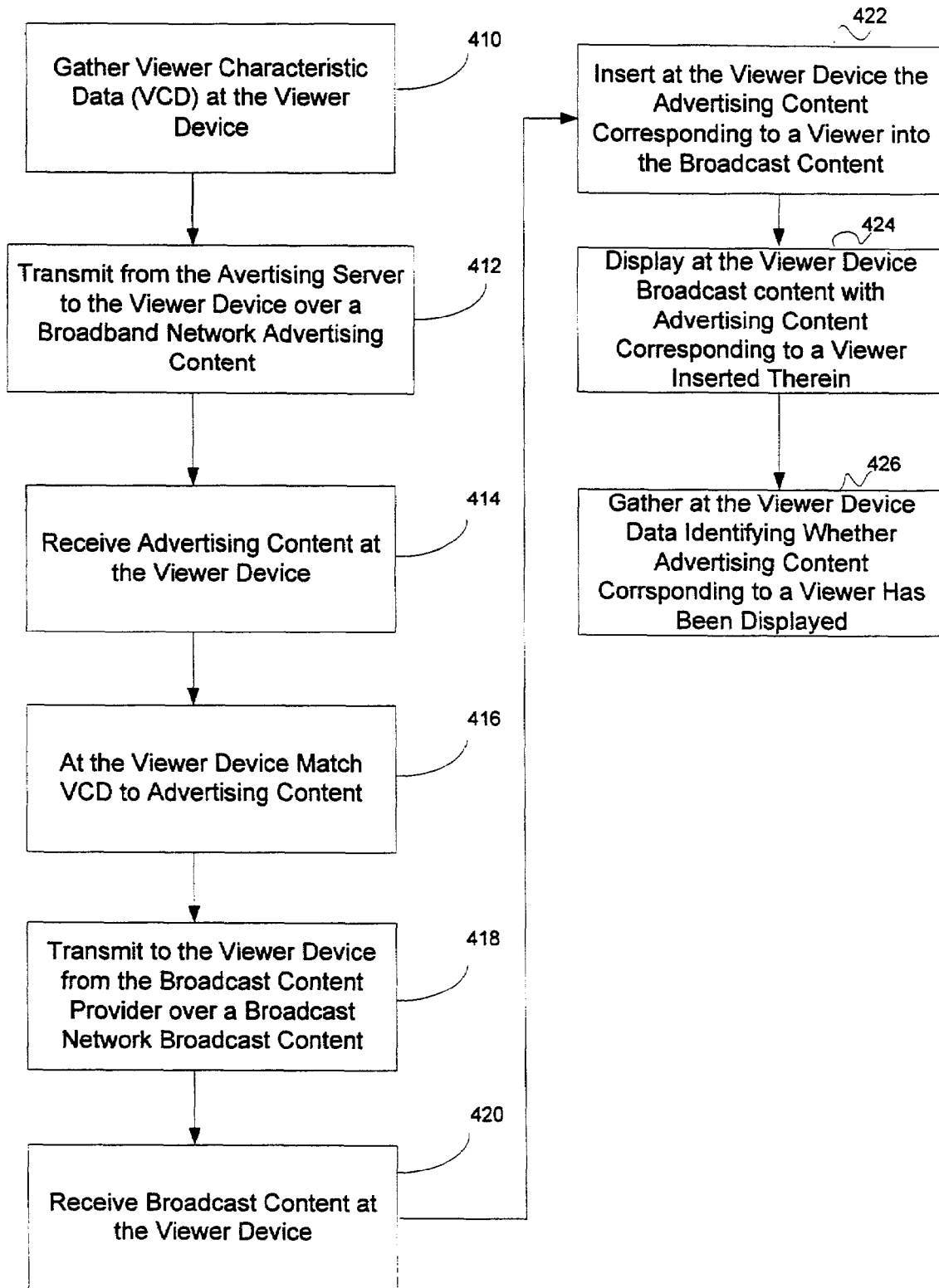
FIG. 4 is a flow chart of an illustrative method for advertisement insertion in accordance with an aspect of the invention.

FIG. 4 is a flow chart of a method for inserting viewer specific advertisements in broadcast content according to an aspect of the invention. At step 410 viewer device 301 gathers data identifying the characteristics of the viewer or operator of the viewer device 301. Data identifying the characteristics of a viewer may consist of the viewer's age, address, marital status, income, interests, hobbies, purchasing habits, television viewing habits, or any other information about the viewer that is valuable to an advertiser. Data may be collected via an application executed by processor 301c that prompts the viewer for the information. Data identifying the characteristics of a viewer may also be obtained by categorizing broadcast programming, and recording at the viewer device the frequency and duration with which the viewer is tuned to broadcast programming in each category.

At step 412, advertising content server 320 transmits advertising content to the viewer device over broadband network 322. At step 414, the advertising content is received at viewer device 301.

At step 416, viewer device 301 identifies advertising content corresponding to the characteristics of a viewer. This step may be performed by matching viewer characteristics to data identifying the target audience for advertising content. For example, if viewer characteristic data indicates the viewer is a male between the ages of 18 and 25, device 301 selects advertisements directed to this segment of society. Device 301 may also select advertisements based upon the geographic location of the viewer. For example, device 301 may select skiing ads for viewers located in Colorado and surfboard ads for viewers located in Hawaii.

At step 418, broadcast content is transmitted from the broadcast content provider to viewer device 301 over a broadcast network. At step 420, broadcast content is received at viewer device 301.

At step 422, viewer device 301 inserts advertising content corresponding to the characteristics of the viewer into the broadcast content. Insertion of advertising content at step 422 may occur in real time, simultaneously with the reception of the advertising content in step 414. Alternatively, advertising content may also be stored at viewer device 301 in memory 301b for insertion at a later time. As discussed previously in connection to FIG. 2, cue tones may be used to identify locations where advertising content may be inserted.

At step 424, viewer device 301 displays on television 302 the broadcast content with the advertising content corresponding to the characteristics of the viewer inserted therein. At step 426, viewer device 301 gathers data identifying whether advertising content matching the characteristics of the viewer has been displayed. This step comprises determining whether a viewer remains tuned to a channel during an advertisement. A record may be kept at the viewer device, and the viewer device may transmit the record to a system that tracks advertisement viewing. Advertisers may use advertisement display data to gather information about which and how many viewers out of the entire group of broadcast content viewers are actually viewing advertising content. Content providers may, therefore, charge advertisers a premium for advertisement display data.

The method for inserting viewer specific advertisements in broadcast content discussed above with reference to FIG. 4 protects viewer privacy because viewer characteristic data is confined to the viewer device and is not sent outside the viewer's home or viewing location.

Figure 5:
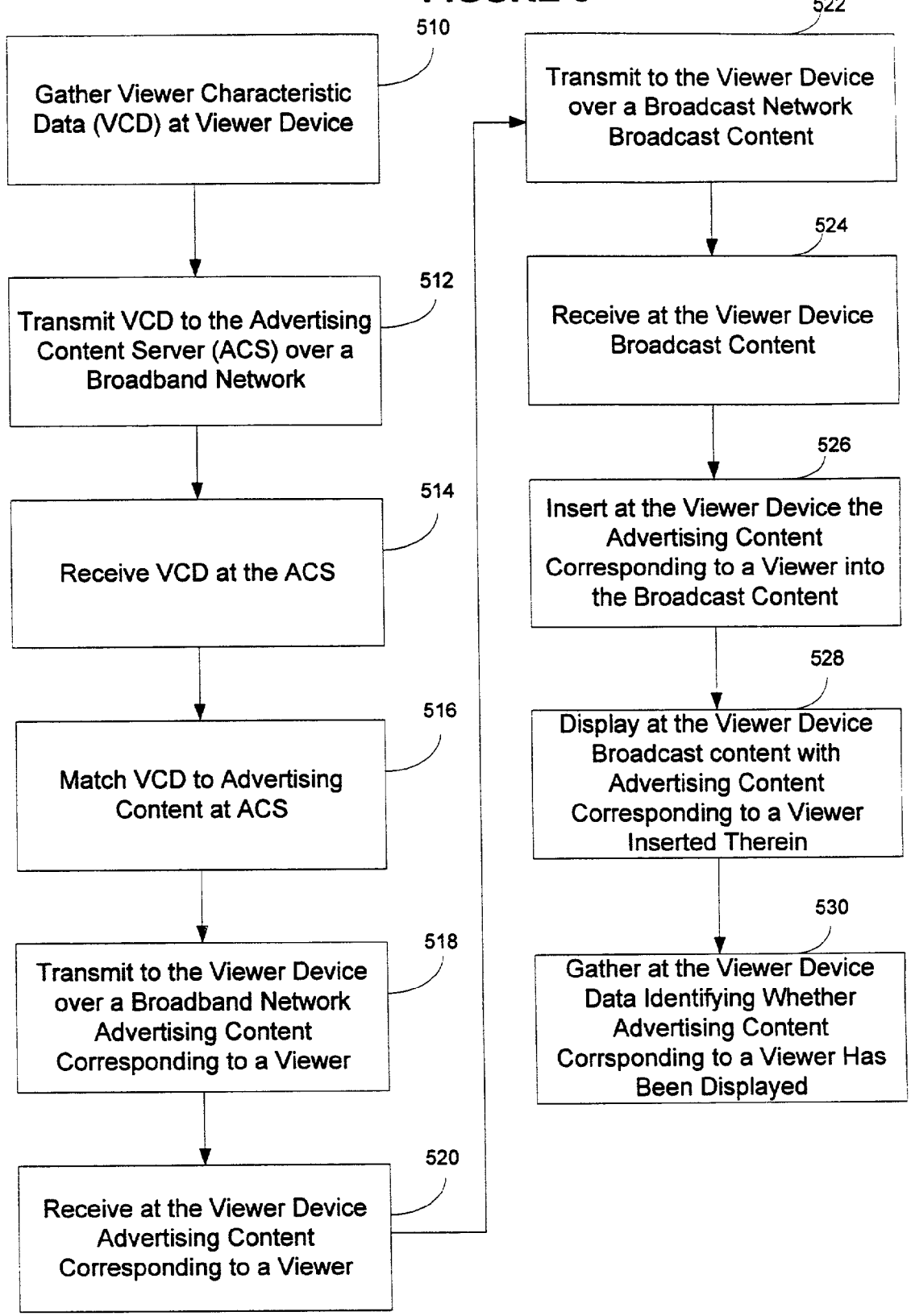
FIG. 5 is a flow chart of an illustrative method for advertisement insertion in accordance with an aspect of the invention.

FIG. 5 is a flow chart of an alternative method for inserting viewer specific advertisements in broadcast content according to an aspect of the invention. At step 510 viewer device 301 gathers data identifying the characteristics of a viewer in a manner similar to that described above in connection with step 410. At step 512, viewer device 301 transmits the data identifying characteristics of a viewer to advertising content server 320 over broadband network 333. At step 514, data identifying characteristics of the viewer is received at advertising content server 320.

At step 516, advertising content server 320 identifies advertising content corresponding to the characteristics of a viewer. At step 518, advertising content corresponding to the characteristics of a viewer is transmitted from advertising server 320 to viewer device 301 over broadband network 333. At step 520, advertising content corresponding to the characteristics of a viewer is received at viewer device 301.

At step 522, broadcast content is transmitted from broadcast content provider 311 to viewer device 301 over broadcast network 332. At step 524, the broadcast content is received at viewer device 301. At step 526, viewer device 301 inserts advertising content corresponding to the characteristics of a viewer into the broadcast content. Insertion of advertising content in step 526 may occur in real time, simultaneously with the reception of the advertising content in step 520. Alternatively, advertising content may be stored at viewer device 301 in memory 301c for insertion at a later time.

At step 528, viewer device 301 displays on television 302 the broadcast content with the advertising content corresponding to the characteristics of the viewer inserted therein. At step 530, viewer device 301 gathers data identifying whether advertising content matching the characteristics of the viewer has been displayed.

Figure 6:
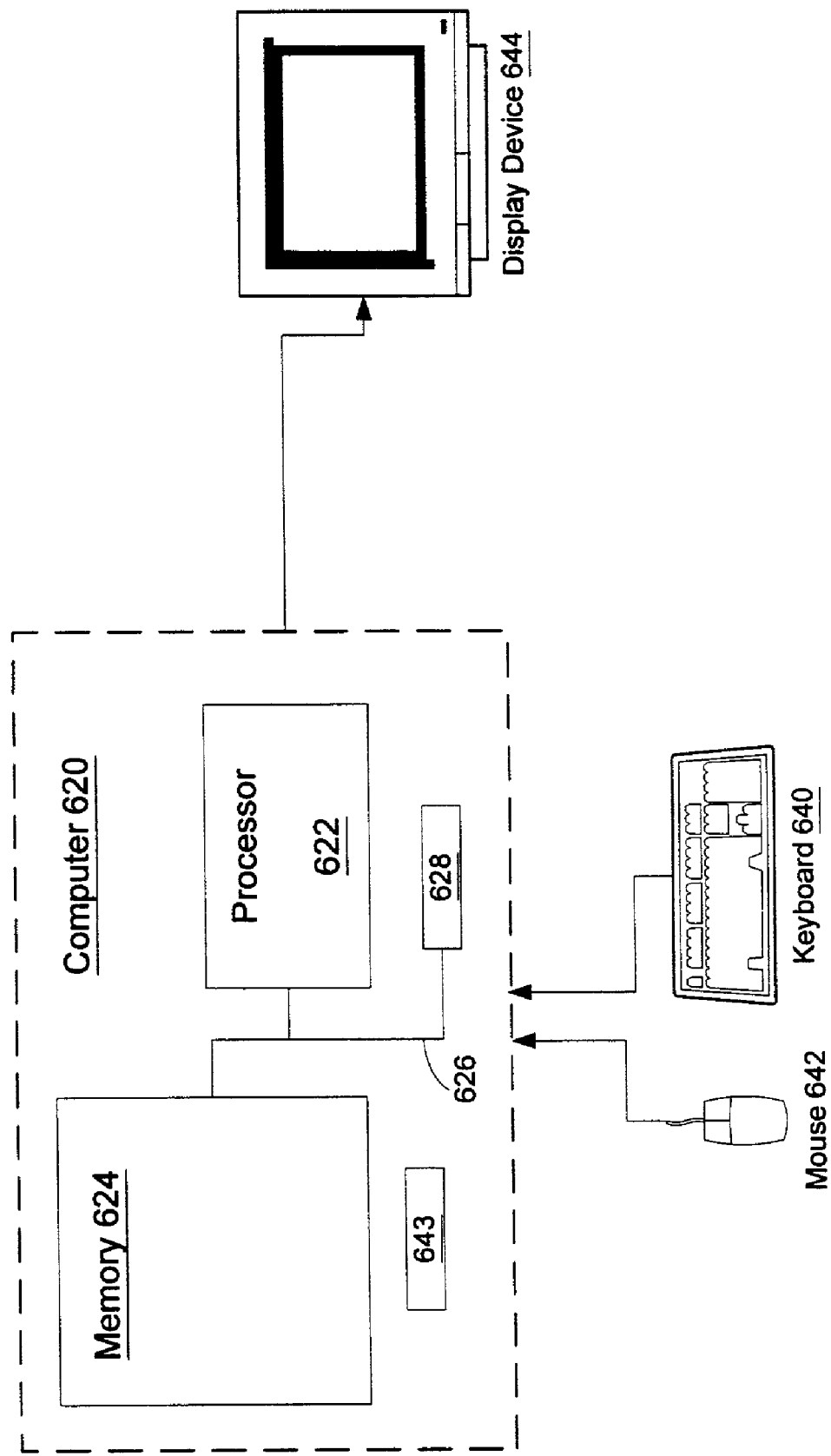
FIG. 6 is a high level diagram of an exemplary computer network for communicating electronic data.

Advertising content server 320 and viewer device 301 may comprise an appropriately programmed computing device. FIG. 6 is a block diagram of a generic computing system suitable for use in a system in accordance with the present invention. As shown, computing device 620 includes processing unit 622, system memory 624, and system bus 626 that couples various system components including system memory 624 to the processing unit 622. The system memory 624 might include read-only memory (ROM) and random access memory (RAM). The system might further include hard-drive 628, which provides storage for computer readable instructions, data structures, program modules and other data. A user may enter commands and information into the computer 620 through input devices such as a keyboard 640 and pointing device 642 which may be, for example, a mouse or remote control. A monitor 644 or other type of display device is also connected to the system for output. Communications device 643, which in one embodiment may be a modem, provides for communications over a network such as, for example, broadband network 333 and the internet 321. Processor 622 can be programmed with instructions to interact with other computing systems so as to perform the algorithms described below with reference to FIGS. 4 and 5. The instructions may be received from networks 321 and 333 or stored in memory 624 and/or hard drive 628. Processor 622 may be loaded with any one of several computer operating systems such as Windows NT, Windows 2000, or Linux.

Those skilled in the art understand that computer readable instructions for implementing the above described processes, such as those described with reference to FIGS. 4 and 5, can be generated and stored on one of a plurality of computer readable media such as a magnetic disk or CD-ROM. Further, a computer such as that described with reference to FIG. 6 may be arranged with other similarly equipped computers in a network and loaded with computer readable instructions for performing the above described processes. Specifically, referring to FIG. 6, microprocessor 622 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described as being used to insert advertising content transmitted over a DSL network into broadcast content transmitted over a DTH satellite network, the invention might also be used to insert advertising content transmitted over any broadband network into advertising content transmitted over any broadcast network. Furthermore, viewer characteristic data may be any information that is valuable to a viewer and is not intended to be limited to the examples listed in this section. Accordingly, reference should be made to the appended claims as indicating the scope of the invention.

What is claimed:

1. A method for inserting advertising content in broadcast programming, comprising the steps of:
   gathering at a viewer device data identifying characteristics of a viewer that is confined to the viewer device;
   receiving at the viewer device advertising content;
   identifying at the viewer device advertising content corresponding to the confined characteristics of the viewer;
   receiving at the viewer device broadcast content;
   inserting at the viewer device into the broadcast content the advertising content corresponding to the confined characteristics of the viewer;
   displaying at the viewer device the broadcast content with the advertising content matching the confined characteristics of the viewer inserted therein; and
   gathering at the viewer device data identifying whether the advertising content matching the confined characteristics of the viewer has been displayed by the viewer device.

2. The method of claim 1, wherein said step of gathering at a viewer device data identifying characteristics of a viewer comprises gathering data regarding at least one of the following: age; address; marital status; income; interests; hobbies; purchasing habits; location; and television viewing habits.

3. A method as in claim 1, wherein the step of gathering at a viewer device data identifying characteristics of a viewer comprises the steps of:
   identifying a plurality of categories into which broadcast programming may be grouped; and
   recording the frequency and duration with which the viewer is tuned to broadcast programming in each of said plurality of categories.

4. The method of claim 1, wherein the step of identifying at the viewer device advertising content corresponding to the characteristics of the viewer comprises matching data identifying the target audience for advertising content to the characteristics of the viewer.

5. A method as in claim 1, wherein said step of receiving at the viewer device broadcast content comprises receiving broadcast content from one of a direct to home satellite distribution network and a cable television network.

6. A method as in claim 1, wherein said step of receiving at the viewer device advertising content comprises receiving at the viewer device advertising content from a digital subscriber line (DSL) broadband network.

7. A method as in claim 1, further comprising the step of storing at the viewer device advertising content for insertion into broadcast content at a later time.

8. A method as in claim 1, wherein said step of receiving at the viewer device advertising content is performed simultaneously with said step of inserting at the viewer device into the broadcast content advertising content corresponding to the confined characteristics of a viewer.

9. A method as in claim 1, further comprising detecting at the viewer device cue tones in the broadcast content identifying locations where advertising content may be inserted.

10. A computer readable medium having stored thereon computer executable instructions for performing the method as recited in claim 1.

* * * * *